US008583188B2

(12) United States Patent
Sundaresan et al.

(10) Patent No.: US 8,583,188 B2
(45) Date of Patent: Nov. 12, 2013

(54) ADVERTISEMENTS ON MOBILE DEVICES USING INTEGRATIONS WITH MOBILE APPLICATIONS (75) Inventors: Subash Sundaresan, Fremont, CA (US); Ramesh Sarukkai, Union City, CA (US); Sam P. Hamilton, Los Altos, CA (US); Julie Wan-Chi Cheng, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/598,062

(22) Filed: Aug. 29, 2012

(65) Prior Publication Data
US 2013/0045778 A1  Feb. 21, 2013

Related U.S. Application Data (63) Continuation of application No. 11/939,685, filed on Nov. 14, 2007, now Pat. No. 8,275,419.

(51) Int. Cl.
*H04M 1/00* (2006.01)
*H04B 1/38* (2006.01)

(52) U.S. Cl.
USPC ........ 455/566; 455/425; 455/457; 455/456.6; 455/419; 455/408

(58) Field of Classification Search
USPC .............. 455/566, 457, 456.6, 419, 408, 425
See application file for complete search history.

(56) References Cited

U.S. PATENT DOCUMENTS

| 6,009,409 | A  | 12/1999 | Adler et al. |
| 6,026,368 | A  | 2/2000 | Brown et al. |
| 6,199,045 | B1 | 3/2001 | Giniger et al. |
| 6,343,317 | B1 | 1/2002 | Glorikian |

(Continued)

FOREIGN PATENT DOCUMENTS

JP   2007-188150 A   7/2007
KR  10-2007-0022444 A   2/2007

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007. Retrieved from http://www.smaato.com/download/pressarea/Smaato_CTIA_20071022_release.pdf.

(Continued)

*Primary Examiner* — Kwasi Karikari
(74) *Attorney, Agent, or Firm* — Nathan O. Greene; Brinks Hofer Gilson & Lione (57) ABSTRACT

A server for delivering advertisements to mobile devices includes an application programming interface executable by a processor and configured to: receive an ad call over a network from an application of a mobile device to deliver an advertisement to an ad position on a small screen thereof, the ad position located at a fixed location of the application, the fixed location having a fixed height and a fixed width as viewed by a user of the mobile device throughout use of the application; detect the ad position, including the fixed height and width of the ad position within the fixed location; retrieve from the storage memory an advertisement having an ad format best matching the fixed height and the fixed width for filling the ad call at the fixed location; and deliver the advertisement to the mobile device for display in the ad position during the execution of the application.

20 Claims, 4 Drawing Sheets

(56) References Cited

U.S. PATENT DOCUMENTS

| | | | |
|---|---|---|---|
| 6,377,793 | B1 | 4/2002 | Jenkins |
| 6,401,075 | B1 | 6/2002 | Mason et al. |
| 6,480,713 | B2 | 11/2002 | Jenkins |
| 6,654,725 | B1 | 11/2003 | Langheinrich et al. |
| 6,681,107 | B2 | 1/2004 | Jenkins et al. |
| 6,714,975 | B1 | 3/2004 | Aggarwal et al. |
| 6,826,572 | B2 | 11/2004 | Colace et al. |
| 6,907,566 | B1 | 6/2005 | McElfresh et al. |
| 6,928,615 | B1 | 8/2005 | Haitsuka et al. |
| 6,985,742 | B1 | 1/2006 | Giniger et al. |
| 7,043,483 | B2 | 5/2006 | Colace et al. |
| 7,177,429 | B2 | 2/2007 | Moskowitz et al. |
| 7,363,024 | B2 | 4/2008 | Jenkins |
| 7,613,691 | B2 | 11/2009 | Finch |
| 7,707,605 | B2 | 4/2010 | Yamada et al. |
| 8,275,419 | B2 | 9/2012 | Sundaresan et al. |
| 2002/0046259 | A1 | 4/2002 | Glorikian |
| 2002/0073034 | A1 | 6/2002 | Wagner et al. |
| 2002/0078101 | A1 | 6/2002 | Chang et al. |
| 2003/0013483 | A1* | 1/2003 | Ausems et al. ............... 455/556 |
| 2003/0046161 | A1 | 3/2003 | Kamangar et al. |
| 2003/0149938 | A1 | 8/2003 | McElfresh et al. |
| 2004/0039733 | A1 | 2/2004 | Soulanille |
| 2004/0054576 | A1 | 3/2004 | Kanerva et al. |
| 2004/0093327 | A1 | 5/2004 | Anderson et al. |
| 2004/0137416 | A1 | 7/2004 | Ma et al. |
| 2004/0186776 | A1 | 9/2004 | Llach |
| 2005/0010477 | A1 | 1/2005 | Sullivan et al. |
| 2005/0154746 | A1 | 7/2005 | Liu et al. |
| 2005/0174975 | A1 | 8/2005 | Mgrdechian et al. |
| 2006/0085419 | A1 | 4/2006 | Rosen |
| 2006/0149630 | A1 | 7/2006 | Elliott et al. |
| 2006/0172697 | A1 | 8/2006 | Gallego et al. |
| 2006/0194572 | A1 | 8/2006 | Fresonke et al. |
| 2006/0194595 | A1 | 8/2006 | Myllynen et al. |
| 2007/0088801 | A1* | 4/2007 | Levkovitz et al. ............ 709/217 |
| 2007/0130012 | A1 | 6/2007 | Yruski et al. .................. 705/14 |
| 2007/0174490 | A1* | 7/2007 | Choi et al. .................... 709/246 |
| 2007/0178889 | A1* | 8/2007 | Cortegiano et al. ........ 455/414.3 |
| 2007/0180147 | A1 | 8/2007 | Leigh |
| 2007/0300152 | A1* | 12/2007 | Baugher ....................... 715/522 |
| 2008/0195457 | A1 | 8/2008 | Sherman et al. |
| 2008/0276266 | A1* | 11/2008 | Huchital et al. ............... 725/32 |
| 2009/0006375 | A1* | 1/2009 | Lax et al. ......................... 707/5 |

OTHER PUBLICATIONS

"ESME," Wikipedia, the free encyclopedia, p. 1, http://en.wikipedia.org/wiki/ESME, last modified Dec. 20, 2006, last visited Oct. 9, 2007.

"Limbo Offers Purina Pet Lodown," Adweek, pp. 1-2, http://www.adweek.com/aw/iq_interactive/article_display.jsp?vnu_content_id=1003665626, dated Oct. 31, 2007, last visited Apr. 1, 2008.

"My First 6 Yahoo Panama 'Enhancement' Requests [Archive]", Search Engine Watch Forums, pp. 1-2, http://forums.searchenginewatch.com/archive/index.php/t-15882.html, containing posts from Jan. 18, 2007 to Jan. 25, 2007, last visited Apr. 23, 2008.

"Network Switching Subsystem," Wikipedia, the free encyclopedia, pp. 1-6, http://en.wikipedia.org/wiki/Network_Switching_Subsystem, last modified Oct. 9, 2007, last visited Oct. 9, 2007.

"Short message service center," Wikipedia, the free encyclopedia, pp. 1-2, http://en.wikipedia.org/wiki/Short_message_service_center, last modified Sep. 11, 2007, last visited Oct. 9, 2007.

"Short message service," Wikipedia, the free encyclopedia, pp. 1-5, http://en.wikipedia.org/wiki/Short_message_service, last modified Oct. 9, 2007, last visited Oct. 9, 2007.

"Signal Transfer Point," Wikipedia, the free encyclopedia, p. 1, http://en.wikipedia.org/wiki/Signal_transfer_point, last modified Aug. 16, 2007, last visited Oct. 9, 2007.

"Strong Partners for Effective Mobile Advertising: Adconion Media Group and Smaato Enter Strategic Partnership," San Mateo / Munich, Germany—May 9, 2007. Retrieved from http://www.smaato.com/download/pressarea/Smaato_AMD_20070503_release.pdf.

International Preliminary Report on Patentability, Application No. PCT/US2008/081445, dated May 18, 2010 (7 pages).

International Search Report from corresponding International Application No. PCT/US2008/081445, dated May 29, 2009 (13 pages).

Smaato—Media / Developers. Retrieved on Jan. 3, 2008 from http://www.smaato.com/mo_mediadev.php.

Smaato—Mobile Carriers. Retrieved on Jan. 3, 2008 from http://www.smaato.com/mo_carriers.php.

Smaato—Mobile Marketing. Retrieved on Jan. 3, 2008 from http://www.smaato.com/mobile.php.

\* cited by examiner

ADVERTISEMENTS ON MOBILE DEVICES USING INTEGRATIONS WITH MOBILE APPLICATIONS

RELATED APPLICATIONS

This application is a continuation application of U.S. patent application Ser. No. 11/939,658, filed Nov. 14, 2007 and entitled "Advertisements on Mobile Devices Using Integrations with Mobile Applications," now U.S. Pat. No. 8,275,419, issued Sep. 25, 2012, which is incorporated herein by this reference in its entirety.

BACKGROUND

1. Technical Field

The disclosed embodiments relate to advertisements (ads) on mobile devices, and more particularly, to ads served to mobile devices using integrations of ad position within applications through which the ads are displayed.

2. Related Art

Advertising on the interne has been historically tied to content. Advertisements ("ads") are displayed on specific web pages. Monetization of those ads typically involves and benefits the publisher of content displayed as part of a web page on a mobile device. This model has worked well on the personal computer because there is adequate real-estate or display area on a personal computer screen as part of the content for insertion of the ads, e.g., within the web page of the browser used to display the content. Additionally, the content publisher usually provides key content (and possibly user) data to ensure good targeting of the ads. Targeting of ads involves the gathering and tracking of personal user information and browsing behavior of particular searchers with which advertising is custom-fit to those particular people.

However, the service of ads to mobile devices varies in significant ways. Given the small size of most mobile device screens, there is limited space for the content to share with ads. This often results in unsatisfactory viewing experiences by searchers, which significantly diminishes advertising results for advertisers. For example, an advertiser may insert ads at the end of a short messaging service (SMS) message. SMS messages, however, have a fixed maximum length and this technique depends on adequate space, e.g., a certain number of characters, being left over for the ad to be inserted for display.

There also exists a lack of adequate context in the mobile devices advertising arena to improve targeting of ads to particular users. For example, an e-mail or SMS message may provide very little value for targeting to commercial ad categories. This is because every day messages are very personal and do not necessarily have a commercial context. In contrast, a web browser on a computer, for instance, has as one of its primary purposes the access by users to commercial information and purchasing opportunities. With cookies, internet protocol (I.P.) address resolution, the ability to track clicks, etc., the web browser of a personal computer is a useful tool for tracking commercial-related information of a user. These abilities are not integrated within a mobile device, and therefore, the ability to track a user's commercial-related behavior and interests is more difficult.

It is also known to stream advertisements through a client window displayed on a personal computer and to provide a user interface controls for interaction therewith. This client window is not fixed but is movable by the user to various positions within the computer's screen. The client window also is not integrated within a specific application, although interaction with the client window may cause a linking action that causes a web browser of the computer to go to a website of an advertiser.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
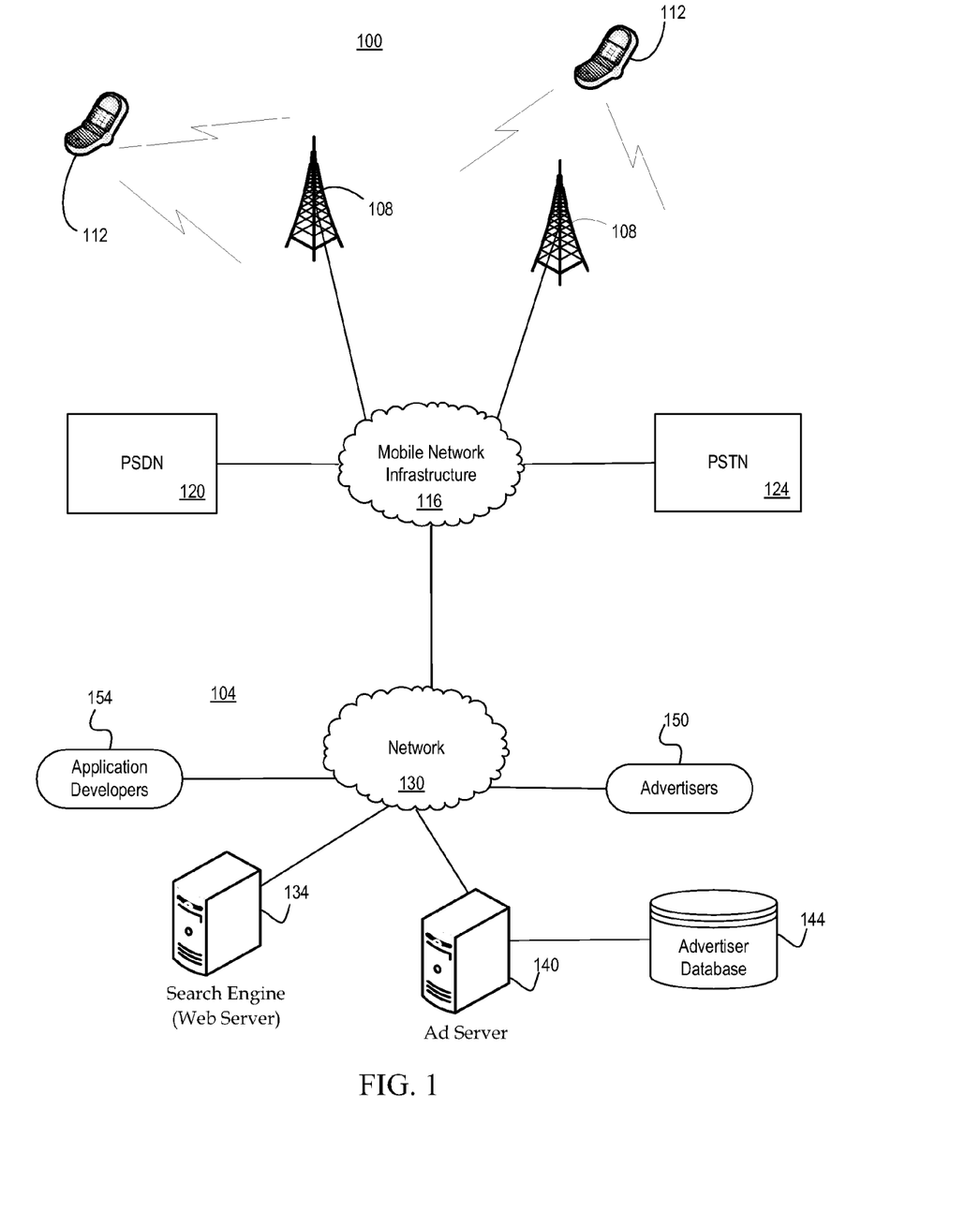
FIG. 1 illustrates a system diagram of a wireless cellular network as interconnected with an advertisement serving network.

FIG. 1 illustrates a system diagram of a wireless cellular network 100 as interconnected with an advertisement serving network 104. The wireless cellular network 100 includes a plurality of cellular towers 108 through which a plurality of mobile devices 112 gain access to a mobile network infrastructure 116 that provides, in addition to linkage to other mobile devices 112, the proper routing for delivery of content, including advertisements, to the mobile devices 112. The wireless cellular network 100 additionally includes a public switched data network (PSDN) 120 and a public switched telephone network (PSTN) 124. Each respective cellular tower 108 provides radio communication for mobile devices 112 in a geographic area served by the respective cellular tower 108. Mobility is provided for the mobile devices 112 by handing off radio communication from one cellular tower 108 to another as the mobile devices move through an area.

The mobile network infrastructure 116, the PSDN 120, and the PSTN 124 all may communicate through another network 130 such as the interne, the World Wide Web, a local area network (LAN), a wide area network (WAN), and/or through an extranet. The mobile network infrastructure 116 and the network 130 may include some levels of integration between the two, and therefore, that each is separately labeled is for clarity of discussion only. The ad serving network 104 may include the network 130, and accessible therethrough, a search engine (or Web server) 134, an ad server 140 including an advertiser database 144, and a plurality of advertisers 150 and mobile application developers 154.

The advertiser database 144 is for storing advertisements ("ads") and advertiser-related administrative information. The ads are deliverable over the network 130 by the ad server 140 to web pages or other applications executable from personal computing devices, including the mobile devices 112 of interest in this disclosure. Ads include text, graphics and other information and data provided by an advertiser 150 for presentation to a user of a mobile device such as mobile device 112. As previously noted, ads served to a web page or browser of a mobile device 112 are limited in regards to space, dimension, etc., where such ads will oftentimes not be viewable or of such poor quality as to not have the desired marketing affect sought for by an advertiser 150. As will be discussed, one or more ads served by the ad server 140 may be stored locally by a mobile device 112 for insertion, on a rotating basis, into the applications executed thereon. Additionally, the advertisers 150 may submit ads that they want served to applications on mobile devices 112 to the ad server 140, which may be owned or operated by an online service provider (OSP) such as Yahoo! of Sunnyvale, Calif. or Google of Mountain View, Calif. that also act as advertisement brokerages.

There are several popular applications available for current mobile devices or to be available in the future for future mobile devices, which include voice applications such as address book, dialer, and voicemail, and data applications such as browsers, short message service (SMS), e-mail, games, map navigation, etc. There are many sources to these applications, some of which include: (1) chip set and operating system vendors such as Qualcomm® that provide applications integrated within their operating system stack; (2) original equipment (or device) manufactures (OEM) may add or replace applications with their own branded applications; (3) mobile carriers may provide applications that are preinstalled or downloadable; and (4) the developer community may author additional applications. All of these sources of applications are jointly referred to herein as application developers 154.

Figure 2:
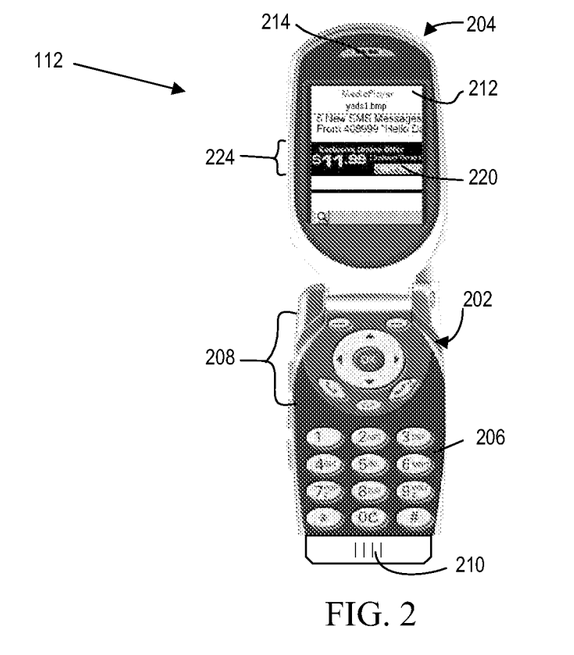
FIG. 2 illustrates an exemplary mobile device depicting an advertisement ("ad") position integrated within a substantially fixed screen location of an application executed thereon.

FIG. 2 is a mobile device 112 suitable for use in conjunction with the wireless cellular network 100 of FIG. 1. The mobile device 112 includes a first body portion 202 and a second body portion 204. The first body portion 202 includes a keypad 206 and other buttons 208 and a microphone 210. The second body portion 204 is attached by a hinge to the first body portion 202 and includes a display screen 212 and a speaker 214. The keypad 206, buttons 208, microphone 210, display 212, and speaker 214 together form a user interface for controlling the mobile device 112 by a user. The physical embodiment of the mobile device 112 is intended to be illustrative only. A wide variety of devices may be used to provide the functionality described herein for a mobile device such as mobile device 112.

The display screen 212 includes a plurality of areas in which text, graphics and other information may be displayed. These areas may typically be defined by software or other applications operating on the mobile device 112. As discussed, such applications include web browsers, short message service (SMS), games, e-mail, and even other non-content applications such as address books, calendars, and dialer screens. The screen 212 of the mobile device 112 displays the application as directed by software code stored in the mobile device 112 for execution of the same. Applications are designed to be executed on certain types of mobile devices 112 where original equipment manufacturers (OEMs) of the devices 112 may need to work with the application developers 154 to ensure that the application as executed fits within the viewable screen 212 area, which is much smaller than a typically computer screen.

The exemplary embodiment of FIG. 2 illustrates an advertisement ("ad") position 220 integrated within a substantially fixed screen location 224 on the display 212 when an application is executed thereon. The ad position 220 may be located in any region or regions of the display screen 212. In accordance with the present embodiments, the ad position 220 is directly integrated into applications that operate in conjunction with the mobile device 112.

Direct integration of a dedicated ad position 220 into specific applications, e.g., coded into the applications for execution on the mobile device 112, and allows the ad position 220 to be reserved in advance. The ad position 220 may be integrated directly into the source code of the application. The location 224 on the screen 212 of the ad position 220 will then remain substantially fixed absent updates or changes to the application itself. Ad position integration within mobile applications prevents the need to custom fit different types of ads within varying available positions of a web page or other content delivered within the applications, thus making ad delivery as disclosed herein content independent. For example, the bottom one-fourth of an SMS application screen could be reserved for an ad. Dedicated ad positions 220 will result in much more predictable space availability for these ads, with fixed height and width dimensions, similar to ads served on a personal computer. Ad position integration will provide better value for advertisers, and also enable greater reach as ads can be inserted in the ad position 220 each time the application is in use, regardless of whether the content enables such a position 220 for an ad.

Note that the screen location 224 is shown as spanning vertically over a set of horizontally running pixel bands, but the screen location 224 may vary vertically and horizontally in any number of possible areas of the screen 212. For instance, the horizontally running pixel bands need not run the entire width of the screen 212. Such areas also need not be symmetrical.

Figure 3:
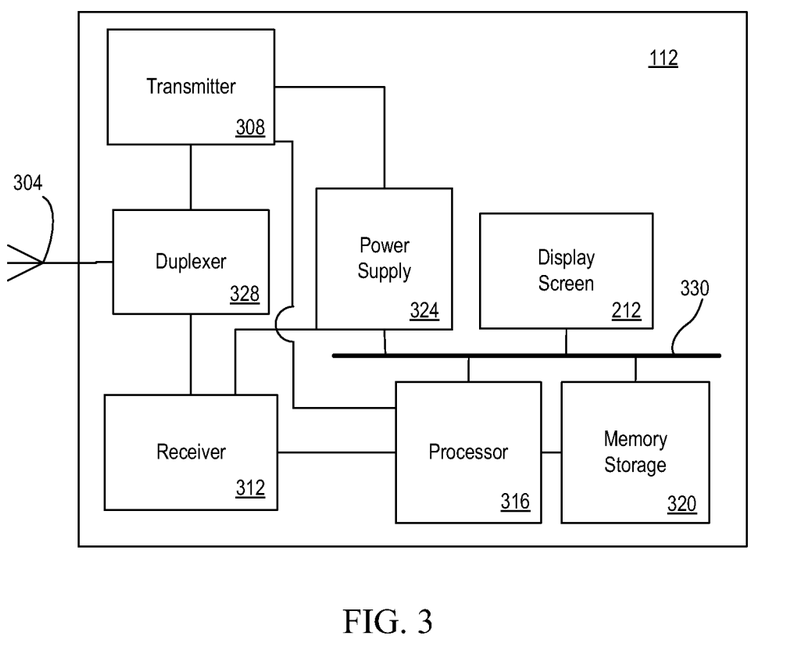
FIG. 3 illustrates a schematic block diagram depicting the inner hardware of a typical mobile device such as that displayed in FIG. 2.

FIG. 3 illustrates a block diagram depicting the inner hardware of a typical mobile device 112 such as that displayed in FIG. 2. The mobile device 112 includes the screen 212, an antenna 304, a transmitter 308, a receiver 312, a processor 316, a memory storage 320 ("storage"), a power supply 324, and a duplexer 328. In an exemplary embodiment, the antenna 304 may be coupled to both the transmitter 308 and the receiver 312, or the transmitter 308 and the receiver 312 may be connected to respective antenna units (not shown). In one embodiment, the duplexer 328 is coupled to both the transmitter 308 and to the receiver 312 to selectively switch between received and sent radio signals.

In another exemplary embodiment, the screen 212, the processor 316, the storage 320, and the power supply module 324 electrically communicate through a communications bus 330. The communications bus 330 is operable to transmit control and communications signals from and between the components connected to the bus 330, such as power regulation, memory access instructions, and other system information. In this embodiment, the processor 316 is coupled to the receiver 312 and to the transmitter 308.

The memory storage 320 stores the applications executed on the mobile device 112 in addition to the ads that may be stored locally for insertion in the ad position 220 created within the application. When the application is active, it will call for ads directly from the ad server 140, and display those ads in the area(s) reserved for ads, e.g., in the ad position 220. The logic for requesting for an ad, as well as the display of the ad, may be independent of the content within the application at any given time. For example, an SMS application could call for an ad whenever the user opens an SMS message. The screen 212 of the mobile device 112 (a cell phone) depicted in FIG. 2 illustrates a sample SMS application with dedicated content independent real estate, the ad position 220 located at the screen location 224, into which an ad has been delivered upon request and inserted by the SMS application.

In one embodiment, an advertising brokerage company collaborates with the application developers 154 of mobile device applications to create dedicated real estate for one or more ads therein. The application developers 154 may integrate an ad call into the application such that the application is enabled to make ad calls to the ad server 140 at various points in the user flow. The ad call retrieves one or more ads from the ad server 140 and stores them in the memory storage 320. When the application is executed, the ad call is then executed to either (or variably) pull an ad from the memory storage 320 or directly from the ad server 140 over the network 116, 130. The ad call pulls ads from these various locations and during intermittent or periodic moments during use of the application as determined by the coded ad call within the ad position 220. When the requested ad is delivered, the mobile device 112 inserts the ad for display to a user within the ad position 220 as located in the substantially fixed screen location 224.

Figure 4:
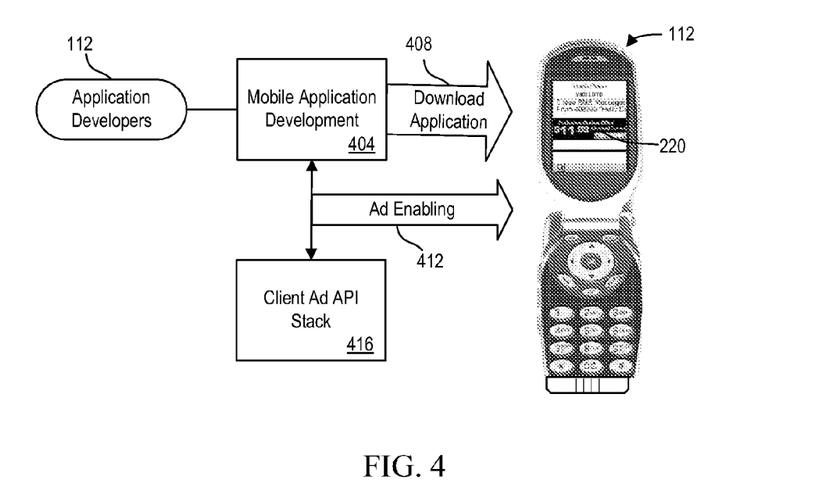
FIG. 4 illustrates a method in which the mobile device of FIG. 2 is initiated for reception of advertising into the ad position.

FIG. 4 illustrates a method in which the mobile device 112 of FIG. 2 is initiated for reception of advertising to the ad position 220. At step 404, a mobile application developer 154, such as an OEM, prepares an application (such as an SMS application) by integrating therein the ad position code. This ad position 220 may be an application programming interface (API) piece of code that is added within the application source code to act as an ad call when the application is executed. At step 408, once the ad position 220 is integrated within the application, the application developer 154 downloads, or caused to be downloaded, the application into the mobile device 112 for execution therein, either over the air or as a pre-load directly into the mobile device 112. At step 412, the application is ad-enabled so that ad service is provided to the mobile device 112. Ad service takes place through a client advertisement application programming interface (API) stack 416 of the ad server 140. When the API of the application loaded on the mobile device 112 is executed, a call is sent to the client API stack 416, which executes a related stack of code that will deliver the ad.

Figure 5:
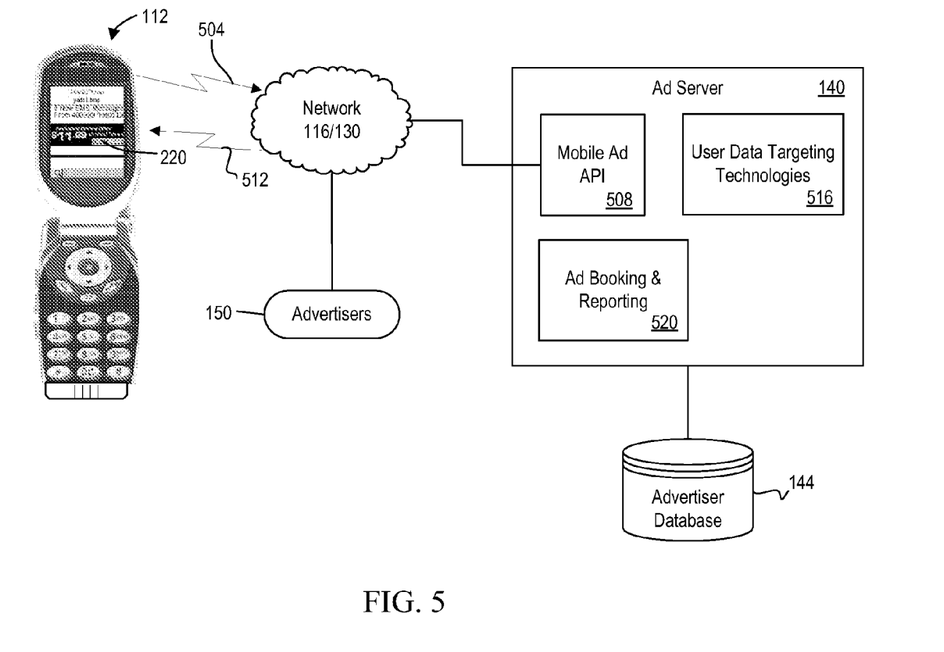
FIG. 5 illustrates a system for serving ads to the mobile device of FIG. 2, which includes employment of user data targeting technologies.

FIG. 5 illustrates a system for serving ads to the mobile device 112 of FIG. 2. The system includes a mobile device 112, a network 116, 130, an ad server 140 and ad database 144. Through a communication link 504 and over the network 116, 130, the mobile device 112 may submit an extensible markup language (XML) ad request to a mobile ad API 508, which is a part of the ad server 140 used for communicating with mobile devices 112. In return, over the network 116, 130 and through a communication link 512, the mobile ad API 508 returns one or more ads per the ad request of the mobile device 112. The processor 316 (FIG. 3) may execute the application and ad calls stored in the memory storage 320 so that the transmitter 308 transmits the communication link 504 and so that the receiver 312 receives the communication link 512. In addition to insertion of one of the received ads in the ad position 220, the mobile device 112 may also store in the memory storage 320 a plurality of received ads for rotatable insertion in the ad position 220 during the use of the application that made the ad call. When the ad server 140 sends the one or more ads as requested by the ad call of the ad position 220, the ad server 140 selects an ad format, to include size, resolution, number of colors, etc., to best match the screen size and capabilities of the mobile device 112. This ad format will relate to the size and dimensions, etc., of the ad position 220 found at the fixed screen location 224 of the screen 212.

When another ad call is executed, either after a predetermined period of time of use of the application or upon execution of another application, a new plurality of ads may be fetched from the ad server 140 by the mobile device 112. These newly received ads may be stored in the memory storage 320 as a replacement or an augmentation to those previously stored therein.

The ad server 140 may include a user data targeting technologies module 516 to carry out analysis on information received and/or stored in the ad server 140 so that the ad server 140 may send to the mobile device 112 targeted advertising as related to the particular user of the mobile device 112. This information may include information related to the user's interests and behavior. For instance, the information needed for such targeting of particular users may be obtained as they interact through various applications of the mobile device 112 with those of the ad brokerage company, in addition to interaction with related applications and services whether accessed through the mobile device 112 or other computing devices such as a personal computer.

As long as the ad brokerage company knows the particular user with which it interacts over the network 116, 130, useful targeting information may be collected and eventually used by the user data targeting technologies module 516 to send targeted advertising to the mobile device 112 of a particular user. For instance, the SMS application shown in the mobile device 112 of FIG. 2 could make a request for an ad whenever the user opens an SMS message. The request could carry additional information that would help better target the ad for the user. The information could include a user's location, a model of the mobile device 112 being used by the user, and content being seen by the user. While such content is not needed for service of the ads to the ad position 220, it may be useful for purpose of ad targeting. The ad server 140 may also include an ad booking and reporting module 520 for handling the ad campaigns of the advertisers 154, and for interaction with the same in terms of sending reports.

Figure 6:
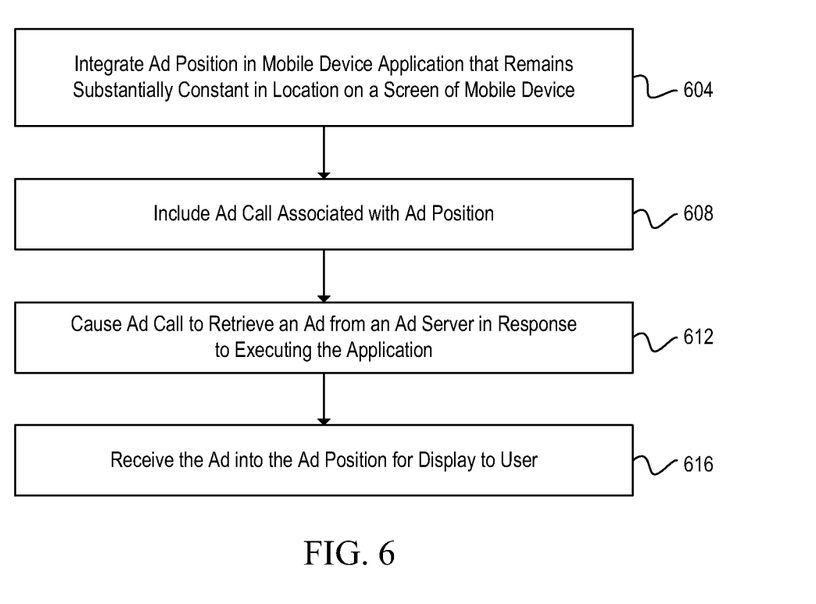
FIG. 6 is a flow chart of an exemplary method for delivering advertisements to mobile devices.

FIG. 6 is a flow chart of an exemplary method for delivering advertisements to mobile devices 112. At block 604, an ad position 220 is integrated within an application executable from a mobile device 112, wherein the ad position 220 remains substantially constant in a location 224 on a screen 212 of the mobile device 112 as viewed by a user throughout use of the application. At block 608, an ad call is included with the ad position 220. At block 612, the ad call is caused to retrieve an advertisement from an ad server 140 in response to execution of the application. At block 616, the advertisement is received into the ad position 220 by the mobile device 112 for display to the user.

Figure 7:
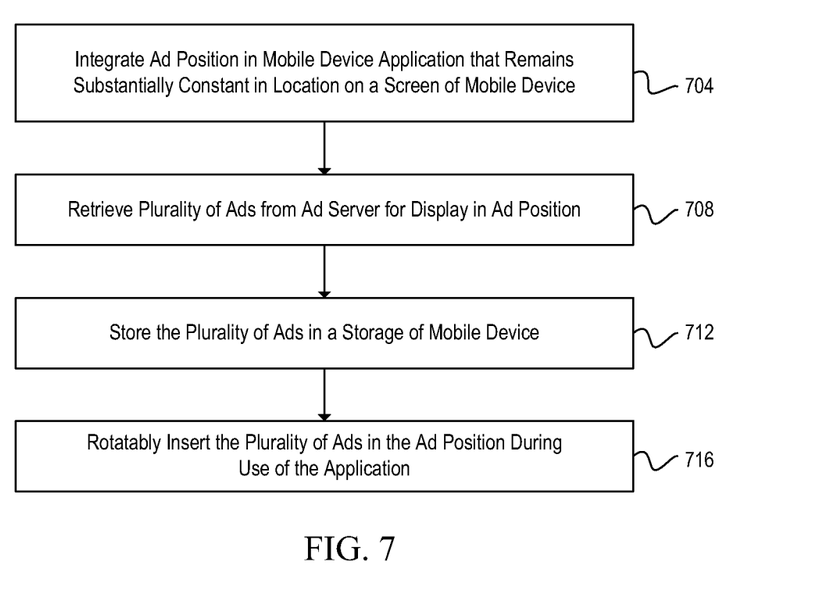
FIG. 7 is a flow chart of another embodiment of the method of FIG. 6.

FIG. 7 is a flow chart of another embodiment of the method of FIG. 6. At block 704, an ad position 220 is integrated within an application executable from a mobile device 112, wherein the ad position 220 remains substantially constant in a location 224 on a screen 212 of the mobile device 112 as viewed by a user throughout use of the application. At block 708, a plurality of advertisements are retrieved from an ad server 140 for display within the ad position 220. At block 712, the plurality of ads are stored in a storage 320 of the mobile device 112. At block 716, the plurality of ads are rotatably inserted in the ad position 220 during use of the application.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of medial machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A server for delivering advertisements to mobile devices, comprising:
    a processor and storage memory;
    a mobile advertisement ("ad") application programming interface ("API") executable by the processor and configured to:
        receive an ad call over a network from an application of a mobile device to deliver an advertisement to an ad position on a small screen of the mobile device, the ad position located at a fixed location of the application, the fixed location having a fixed height and a fixed width as viewed by a user of the mobile device throughout use of the application;
        detect the ad position, including the fixed height and width of the ad position within the fixed location;
        retrieve from the storage memory an advertisement having an ad format best matching the fixed height and the fixed width for filling the ad call at the fixed location; and
        deliver the advertisement to the mobile device for display in the ad position during the execution of the application;
        where the detecting the ad position, and the retrieving and delivering the advertisement are performed independent of content of the application that is executed on the mobile device.

2. The server of claim 1, where the ad format further includes a resolution and a number of colors of the screen of the mobile device, and retrieving the advertisement further includes selecting the advertisement that best matches the resolution and the number of colors of the small screen.

3. The server of claim 1, where the ad API is further configured to deliver multiple advertisements having a corresponding fixed height and fixed width for storage on the mobile device, for rotatable display of the multiple advertisements in the ad position.

4. The server of claim 1, where the processor is configured to receive additional information from the mobile device regarding the user of the mobile device, further comprising a user data targeted technologies module executable by the processor and configured to:
    analyze the additional information for behavior and interests of the user; and
    retrieve the advertisement that also targets the behavior or interests of the user found within the additional information.

5. The server of claim 4, where the processor is further configured to track the behavior and interests of the user by gathering information generated by interaction of the user with multiple applications executed on the mobile device.

6. The server of claim 4, where the additional information includes a location of the user.

7. The server of claim 1, where the application comprises an application selected from the group consisting of: a short message service (SMS), a calendar, a game, an address book, an electronic mail application, a dialer and voicemail, and a map navigation application.

8. A method for delivering advertisements to mobile devices, the method executable by a server having a processor and storage memory, the method comprising:
    executing, using the processor, a mobile advertisement ("ad") application programming interface ("API");
    receiving through the API an ad call over a network from an application of a mobile device, the ad call including a request that the server deliver an advertisement to an ad position on a small screen of the mobile device, the ad position located at a fixed location of the application, the fixed location having a fixed height and a fixed width as viewed by a user of the mobile device throughout use of the application;
    detecting the ad position through the API, comprising detecting the fixed height and width of the ad position within the fixed location;

retrieving from the storage memory an advertisement having an ad format best matching the fixed height and the fixed width for filling the ad call at the fixed location; and delivering, using the processor, the advertisement to the mobile device for display in the ad position during the execution of the application, where the detecting the ad position, and the retrieving and delivering the advertisement are performed independent of content of the application that is executed on the mobile device.

9. The method of claim 8, where the ad format further includes a resolution and a number of colors of the screen of the mobile device, and retrieving the advertisement further includes selecting the advertisement that best matches the resolution and the number of colors of the small screen.

10. The method of claim 8, further comprising delivering, via the API, multiple advertisements having a corresponding fixed height and fixed width for storage on the mobile device, for rotatable display of the multiple advertisements in the ad position.

11. The method of claim 8, further comprising:
receiving additional information from the mobile device regarding the user of the mobile device;
analyzing the additional information for behavior and interests of the user; and
retrieving the advertisement that also targets the behavior or interests of the user found within the additional information.

12. The method of claim 11, further comprising tracking the behavior and interests of the user by gathering information generated by interaction of the user with multiple applications executed on the mobile device.

13. The method of claim 11, where the additional information includes a location of the user.

14. The method of claim 8, where the application comprises an application selected from the group consisting of: a short message service (SMS), a calendar, a game, an address book, an electronic mail application, a dialer and voicemail, and a map navigation application.

15. A computer-readable storage medium comprising a set of instruction executable by a processor and storage memory of a server for delivering advertisements to mobile devices, the set of instructions comprising;
instructions to direct the processor to execute a mobile advertisement ("ad") application programming interface ("API");
instructions to direct the processor to receive through the API an ad call over a network from an application of a mobile device, the ad call including a request that the server deliver an advertisement to an ad position on a small screen of the mobile device, the ad position located at a fixed location of the application, the fixed location having a fixed height and a fixed width as viewed by a user of the mobile device throughout use of the application;
instructions to direct the processor to detect the ad position through the API, including to detect the fixed height and width of the ad position within the fixed location;
instructions to direct the processor to retrieve from the storage memory an advertisement having an ad format best matching the fixed height and the fixed width for filling the ad call at the fixed location; and
instructions to direct the processor to deliver the advertisement to the mobile device for display in the ad position during the execution of the application,
where the instructions to direct the processor detect the ad position, to retrieve and to deliver the advertisement are executed independent of content of the application that is executed on the mobile device.

16. The computer-readable storage medium of claim 15, where the ad format further includes a resolution and a number of colors of the screen of the mobile device, and the instructions to retrieve the advertisement further comprise instructions to direct the processor to select the advertisement that best matches the resolution and the number of colors of the small screen.

17. The computer-readable storage medium of claim 15, further comprising instructions to direct the processor to deliver, via the API, multiple advertisements having a corresponding fixed height and fixed width for storage on the mobile device, for rotatable display of the multiple advertisements in the ad position.

18. The computer-readable storage medium of claim 15, further comprising:
instructions to direct the processor to receive additional information from the mobile device regarding the user of the mobile device;
instructions to direct the processor to analyze the additional information for behavior and interests of the user; and
instructions to direct the processor to retrieve the advertisement that also targets the behavior or interests of the user found within the additional information.

19. The computer-readable storage medium of claim 18, further comprising instructions to direct the processor to track the behavior and interests of the user by gathering information generated by interaction of the user with multiple applications executed on the mobile device.

20. The computer-readable storage medium of claim 18, where the additional information includes a location of the user.

* * * * *